Jan. 18, 1966

A. ECKERFELD ETAL 3,230,346
ELECTRIC CONTINUOUS FLOW HEATER HAVING
A PLURALITY OF HEATING CHANNELS

Filed Nov. 12, 1964 4 Sheets-Sheet 3

Alfred Eckerfeld and
Lenid Schmann,
INVENTORS

BY Darbo, Robertson & Vanderhugh.
Attorneys

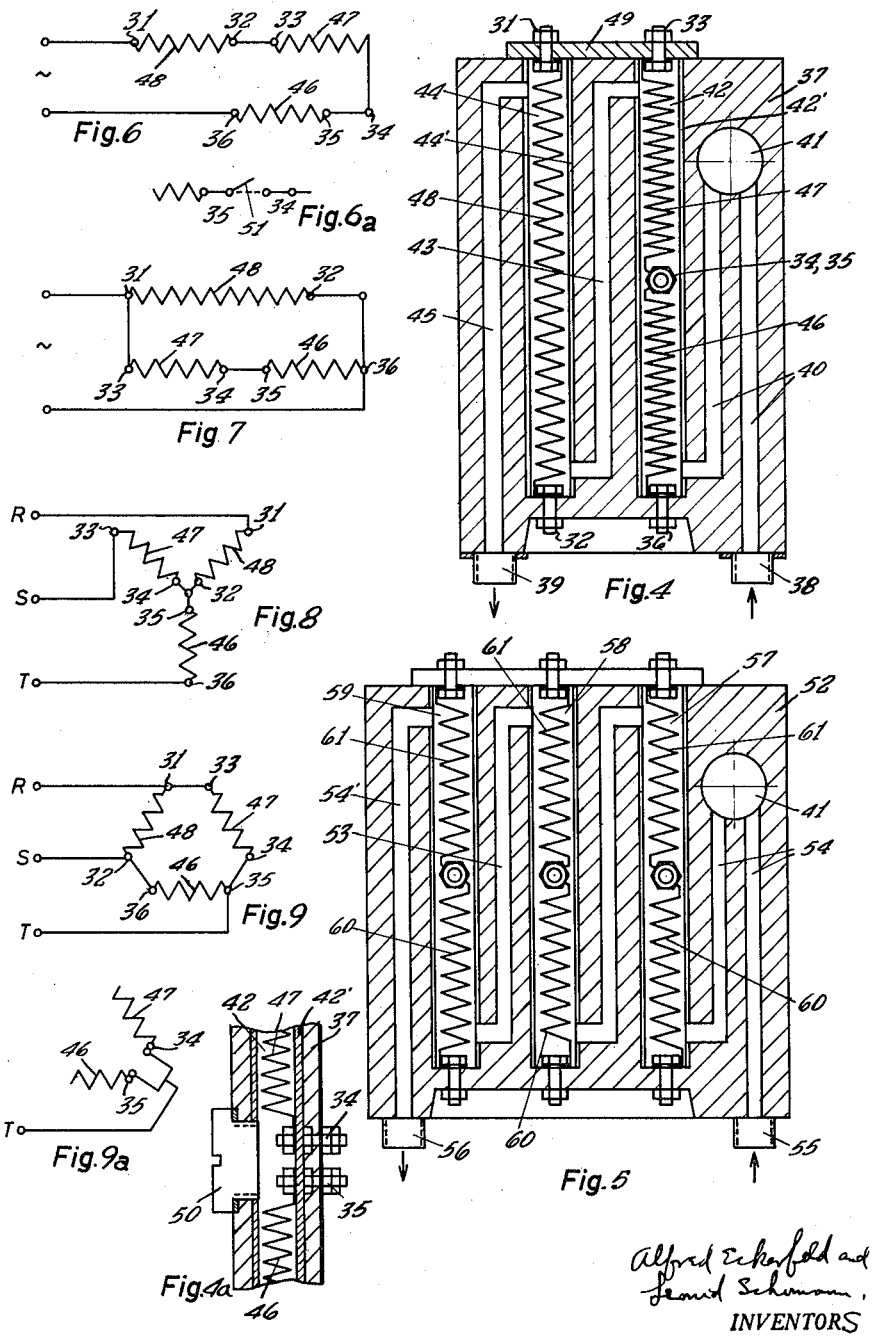

3,230,346
ELECTRIC CONTINUOUS FLOW HEATER HAVING A PLURALITY OF HEATING CHANNELS
Alfred Eckerfeld, 43 Bokenbusch, Langenberg, Rhineland, and Leonid Schomann, Wuppertal-Elberfeld, Germany; said Schomann assignor to said Eckerfeld
Filed Nov. 12, 1964, Ser. No. 415,844
Claims priority, application Germany, Sept. 9, 1960, E 19,899
10 Claims. (Cl. 219—307)

The present application is a continuation-in-part of applications 137,114 and 137,115, filed September 11, 1961, and now abandoned. This application includes no new matter in addition to the disclosures of the above two identified applications.

This invention relates to an electric continuous flow heater having a plurality of heating coils arranged in heating channels of a body of insulating material and in direct contact with the water, wherein the water flows through the heating channels in series. In such a device the water becomes hotter as it flows through additional channels. Thus, the temperature of the water at the discharges of the several channels increases in the downstream direction. As the cooling effect of the hot water is, naturally, much smaller, considerably higher surface temperatures occur in the prior art devices of this type in the less cooled downstream heating coils. These temperatures, according to experience, result in an increased calcareous deposit and in early destruction of the heating coil.

The invention has for its object to decrease the surface temperature of the downstream heating coils and to avoid a disadvantageous increase in the temperature thereof. According to the invention, this is achieved in that the heating efficiency of the heating coil per unit of length is reduced in the downstream heating channels as compared with the upstream heating channels. Starting from the conventional set-up of such apparatus, wherein heating coils of equal power consumptions are connected in parallel or are connected to one phase each of a three-phase alternating current main, the invention may be practiced in a simple manner in that the downstream heating coil is distributed over a heating channel length which is, for example, twice that of the heating channel length provided for the upstream heating coil. For cooling the downstream heating coil, then, double the quantity of pre-heated water is available, so that a correspondingly better cooling effect is achieved and an increase of the surface temperature of the heating coil is avoided.

While using this basic idea, different embodiments are possible, some particularly advantageous ones of which are described in detail hereinbelow with reference to the accompanying drawings.

This invention relates to an electric continuous flow heater wherein a plurality of straight heating channels connected with each other are provided in a block-shaped body of insulating material, wherein heating coils in direct contact with the water are arranged in said heating channels, and wherein resistor channels are provided upstream and downstream of the heating channels in order to form an electric water column resistor. In such devices, the individual heating coils of the different heating channels have been connected with each other at least at one end thereof within the body of insulating material. Usually a long heating coil has been employed which has been wound through several heating channels. With such an arrangement, it is no longer possible, after the apparatus has been finished, to change the electric wiring of the heating coil. If the heating coil burns through in one heating channel, it becomes necessary to exchange the heating coil in a plurality of heating channels.

It will be understood that in apparatus comprising one single heating coil only, both ends of the heating coil must be provided with terminals or the like. In apparatus, however, wherein a plurality of heating coils—three or six in most cases—are provided, heating coil loops which extend through a plurality of heating coils have been used for the sake of economy.

In contrast thereto, the invention resides in the feature that in continuous flow heaters of the type described, each individual heating coil is arranged with both ends extending out of the body of insulating material to external terminals, so that the heating coils can be connected individually with each other and with the current supply lines.

In this way, it is possible during the manufacturing process to separate the assembly of the body of insulating material with the heating coils from the wiring of the apparatus. Thus the heating coils may be connected in circuit in any desired manner even after the assembly of the body of insulating material. The heating coils may be connected either in parallel or in series. They may also be connected to a three-phase alternating current main either in Y or in delta connection. The individual heating coils may be exchanged and replaced. In spite of the additional expense caused by bringing out all ends of the heating coils, the manufacturing and stocking of such apparatus is cheapened and simplified as one single type of body of insulating material having heating coils built in can be used for apparatus of different modes of wiring.

In further development of this invention, while maintaining the advantages described, provision may be made that two heating coils are arranged in one heating channel one behind the other in axial direction and are connected to a terminal provided in the middle of the heating channel.

The arrangement of two heating coils in one heating channel in combination with the feature of external connection of the inner ends of the heating coils offers several advantages. One heating channel may be saved and the dimensions of the continuous flow heater may be reduced without any loss in capacity. Thereby, at the same time, a considerable reduction of the flow resistance is achieved.

Furthermore, this arrangement offers the advantage that such an apparatus may optionally be used with full or half capacity, the power remaining distributed equally on all heating coils. Up to now, a double apparatus had to be used in order to enable an operation with full and half capacity, and one system of this apparatus could be switched off. This required greater cost of material, labor and space.

In many cases it is advantageous if the inner ends of the two heating coils are connected to terminals positioned side by side and are separately brought out of the body of insulating material. This is useful, since the two inner ends of the heating coils generally are of the same potential. With this arrangement, a circuit breaker can be connected between the two terminals positioned side by side. This circuit breaker may, for example, be actuated by a thermostatic safety device. A separate external connection of the inner ends of the heating coils is advantageous also when a delta circuit is to be used. Then the connection of the phase to the delta points can be effected through a separate contact for each coil so that a lower contact load can be expected.

The invention may be practiced in a particularly expedient manner in that in a body of insulating material two heating channels of equal lengths are provided through which the water flows serially, and that two heating coils wound with lower pitch and having centrally connected external terminals are placed in that channel through which the water flows first, whereas a single heating coil wound with larger pitch is provided in the downstream heating channel. In that former heating channel in which still relatively cool water flows, it is possible without disadvantage to employ a heating coil of relatively small pitch, two of which can be provided easily in a heating channel of limited length. With water heated much more, wherein vapor bubbles already begin to be formed, a larger pitch of the heating coil will be advantageous, as according to experience, with closely wound heating coils vapor bubbles are retained in the interstices and cause local overheating. With larger pitch of the heating coil, however, the interstices are too wide as compared with the dimensions of the vapor bubbles, so that the vapor bubbles get loose from the heating coil more easily and are taken along by the flow.

As different potentials may be applied to the individual terminals of the ends of the heating coils, it is advantageous that the individual heating channels be interconnected by resistor channels therebetween forming electric water column resistors. Otherwise, with a direct short connection of the heating channels a short circuit could be caused by the water which would result in corrosion phenomena at the terminals.

Advantageously the wall of the body of insulating material is provided with an opening which is sealingly closed by a plug and which is opposite to the terminal screw extending through the wall of the body of insulating material. Then the connecting spots of the ends of the heating coils are easily accessible from the outside, so that the assembly and replacement of the heating coil is facilitated. In order to make it possible that the heating coils can be easily inserted into the straight heating channels, further provisions is made that the heating channels of the body of insulating material are open at least at one end threreof, and are sealingly closed by a closure after the heating coils have been set in. The terminals may extend through the closure on the axis of the heating channel; they may, however, also be set into the wall of the body of insulating material transversely to the axis of the heating channel.

FIGURE 4 schematically illustrates another embodiment of the invention;

FIGURE 4a is a fragmentary view on an enlarged scale illustrating a modification of the embodiment of FIGURE 4;

FIGURE 5 schematically illustrates an alternative embodiment of the invention;

FIGURE 6 is a schematic wiring diagram illustrating one manner of connecting the embodiment of FIGURE 4 or the modification of FIGURE 4a to a source of power with the resistance elements being in series;

FIGURE 6a is a modification of FIGURE 6 illustrating an alternative manner of connection of the embodiment of FIGURE 4a;

FIGURE 7 is a further alternative connection for the embodiments of FIGURES 4 and 4a with the resistance elements in parallel;

FIGURE 8 is an alternative connection for the embodiments of FIGURES 4 and 4a with the resistance elements in a star configuration;

FIGURE 9 is an alternative connection of the embodiments of FIGURES 4 and 4a with the resistance elements in a delta configuration; and FIGURE 9a is a modification of the delta connection of FIGURE 9.

Figure 1:
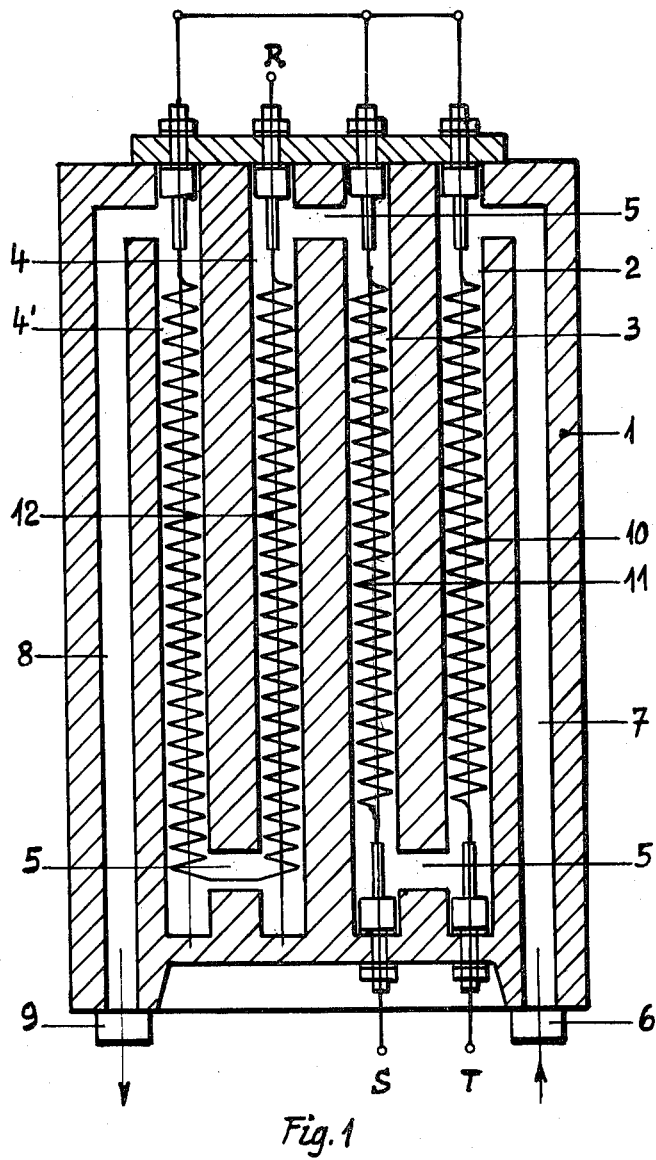
FIGURE 1 is a schematic sectional view of an embodiment of the invention incorporating four heating channels and two resistance channels.

In FIG. 1 a continuous flow heater is shown wherein four heating channels 2, 3, 4, 4' of equal lengths are provided in a block-shaped body 1 of insulating material and are connected in series by connecting channels 5.

An inlet channel 7 connected with the supply socket 6 is provided upstream of the heating channel and serves to form an electric water column resistor. A similar channel 8 opening into the discharge socket 9 is provided downstream of the heating channel 4' as a discharge resistor channel. In the heating channels 2 and 3, heating coils 10 and 11 are provided, each being connected to a phase T, S of a three-phase alternating current main, whereas a longer heating coil 12 connected to a third phase R of three-phase alternating current is arranged in the two heating channels 4, 4'. The heating coils 10, 11, 12 are so dimensioned that each one takes the same electric power. They are connected to a neutral point. The switching on and switching off of the heating coils 10, 11, 12 is effected through a flow-actuated switch (not shown) by making and breaking, respectively, of neutral point connection arranged in the zero voltage range. The resistor channels 7 and 8 open into the heating channels 2, 4' in the range of the zero voltage, so that the water columns provided in the resistor channels 7, 8, remain free of voltage when the heating coils 10, 11, 12 are intact and carry out their protective function only upon breaking of a heating coil.

The water flowing through is heated in the upstream heating channels 2, 3 and enters into the downstream heating channels 4, 4' at an increased temperature. There it is further heated by the heating coil 12 until it reaches the desired discharge temperature. If for the power consumption from the third phase R of the three-phase alternating current only the same length of the heating channel would be available as for the phase T, the heating coil connected with phase R would be less cooled because of the higher water temperature than the heating coil connected with phase T, so that considerably higher surface temperatures would occur in the former heating coil. This would result in increased deposition of lime scale and a gradual destruction of the heating coil due to a progressive decrease of the cooling. In order to avoid this phenomenon, the double length of the heating channels 4, 4' is provided for the power consumption from this heating coil, so that now twice the quantity of water is available for the cooling of this heating coil. Thus, the cooling of the heating coil 12 is improved so that no disadvantageous surface temperatures occur.

Figure 2:
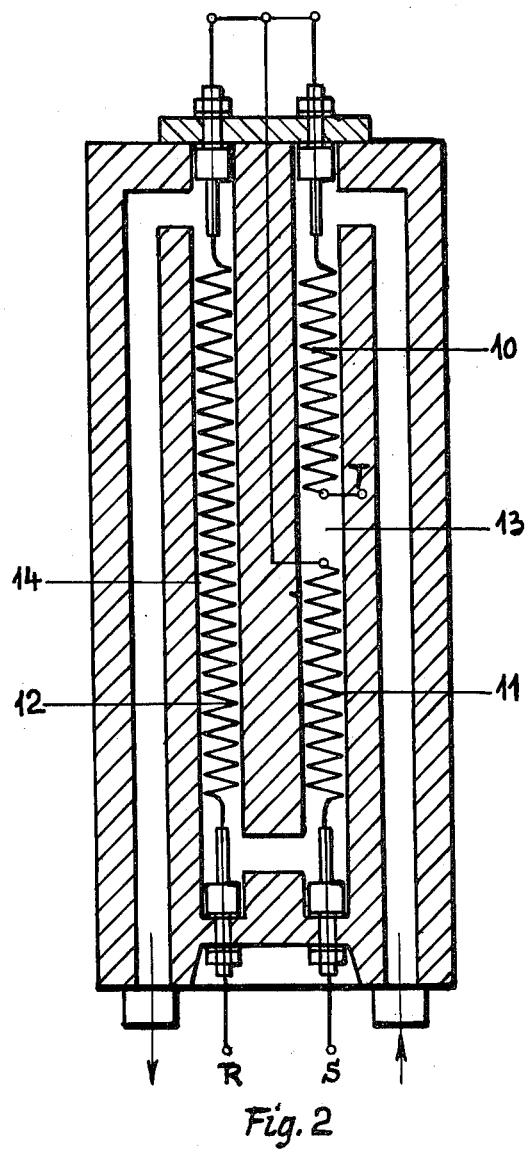
FIGURE 2 is an alternative embodiment incorporating two heating channels and two resistance channels.

In the embodiment shown in FIG. 2, the heating coils 10, 11, 12 are connected in a Y circuit in the same manner, but the heating coils 10 and 11 are arranged in a common heating channel 13 one behind the other in axial direction, as has already been proposed, whereas the heating coil 12 alone is arranged in a second heating channel 14. Thus also here a double length of the heating channel 14 is available for the downstream heating coil 12. Such a device is preferred for apparatus having a smaller power consumption because of the reduced flow resistance.

Figure 3:
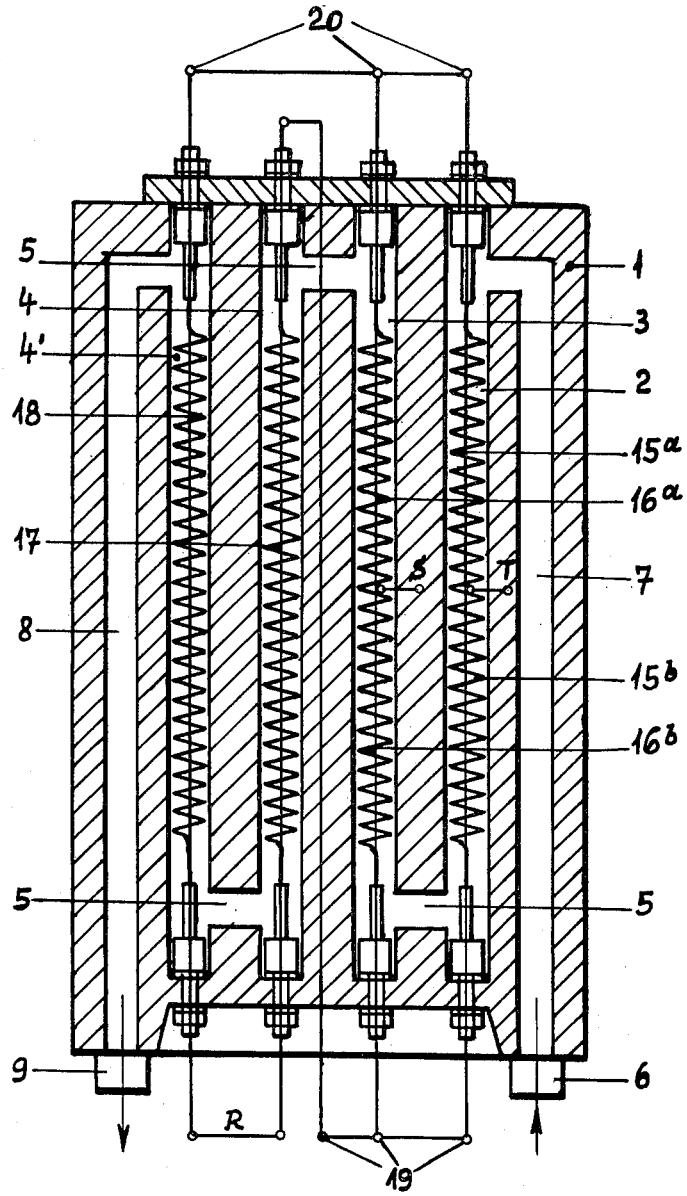
FIGURE 3 is a further embodiment similar to FIGURE 1 except with provision for alternate heating ranges.

In the embodiment shown in FIG. 3, the arrangement of the heating, connection and resistor channels is the same as in the first embodiment. However, two heating coils 15a, 15b, and 16a, 16b or one heating coil having a center tap each are arranged in the upstream heating channels 2, 3 one behind the other in axial direction. The inner connection ends or the center taps are connected to a phase S, T each of the three-phase alternating current main, whereas the outer connection ends are connected to a neutral point on both sides. One heating coil 17, 18 is provided in each of the downstream heating channels 4, 4', these coils being both connected to the third phase R of the three-phase alternating current main, whereas the other end of each coil 17, 18 is connected to one of the neutral points 19, 20. If the neutral point connection 19 is broken by a switch (not shown), the coils 15a, 16a, 18 remain in operation. If, however, the neutral point connection 20 is broken, the coils 15b, 16b and 17 remain switched on. Thus the apparatus can be run with full or half capacity. In each case, however, a heating channel 4 of double length is available for the downstream coil 17, 18 connected to the R phase.

Referring to FIGURE 4, connecting sockets for cold water supply 38 and hot water discharge 39 are provided on the lower surface of a block-shaped plastic body 37 of insulating material. A relatively narrow resistor channel 40 forming an electric water column resistor extends from the connecting socket 38 through a flow-actuated switch 41 (not shown in detail) to the lower end of a heating channel 42. The upper end of the heating channel is connected to the lower end of a second heating channel through a resistor channel 43. The upper end of the second heating channel 44 is connected to the connecting socket 39 through a resistor channel 45 on the discharge side. The heating channels 42, 44 are lined with a heat resistive layer 42', 44'.

Two heating coils 46, 47 arranged axially one behind the other and in direct contact with the water are provided in the heating channel 42. Coils 46, 47 are wound with a relatively small pitch, whereas a single heating coil 48 wound with a correspondingly larger pitch is arranged in the second heating channel 44. The upper openings of the heating coils 42, 44, through which the heating coils 46, 47, 48 are inserted are sealingly closed by a common closure plate 49 of insulating material. The closure plate 49 carries two terminals 31, 33 through which the upper ends of the heating coils 48 and 47 are passed out of the plastic body 37. The lower ends of the heating coils 48 and 46 are connected to terminals 32, 36 and are passed thereby out of the plastic body 37. The inner ends of the heating coils 46, 47 are connected to a terminal 34/35 extending from the front surface into the heating channel 42 in the middle thereof, and are thereby passed out of the plastic body. Alternatively, the two ends of the heating coils can be passed to the outside through two terminals 34 and 35 positioned side by side, as shown in FIG. 4a. In order to be able to connect the inner ends of the coils to the terminals 34, 35 an opening is provided on the rear surface of the plastic body adjacent the terminals 34, 35. This opening is closed sealingly by a plug 50.

When the heating coils 46, 47, 48 are built into the plastic body in the manner described, and are connected to the terminals 31–36, it is possible to connect the heating coils 46, 47, 48 in circuit in different ways outside the plastic body 37, in order to obtain apparatus for different power consumptions and different main connection.

If the terminals 32 and 33 as well as 34 and 35 are connected with each other (FIG. 6), the main connection can be effected at 31 and 36, whereby the heating coils 48, 47, 46 are connected in series. A safety switch 51 may be connected between the terminals 34 and 35 as shown in FIG. 4a. If the terminals 31 and 33 as well as 32 and 35 and 34 and 35 are electrically connected with each other, a parallel connection of the heating coil 48, on the one hand, and of the heating coils 46 and 47, on the other hand, will result.

If the terminals 32, 34, 35 are connected with each other (FIG. 8), a Y-circuit is obtained with three-phase alternating current, the R-phase being connected to 31, the S-phase to 33 and the T-phase to 36. To follow the conventional practice in a three-phase operation of having equal power consumption in each leg, the resistances of coils 46, 47 and 48 would be equal when used as in FIGURES 8 and 9.

Furthermore, one pair of terminals 31, 33 and 32, 36 as well as 34, 35 respectively, may be connected with each other (FIG. 9), and a delta-circuit will be obtained with three-phase alternating current, each one of the three phases R, S, T being connected to one pair of terminals. In order to obtain a low current load of the individual contacts, one phase contact of the phases R, S, T may be provided for each individual terminal, as shown in FIG. 9.

The switching on and switching off of the main is effected in well known manner (not shown) by an electrical flow-actuated switch actuated upon water flow by the pressure or by a dynamic pressured drop. The water flowing through is relatively cool in the heating channel 42, so that vapor bubbles can not yet be formed there. Therefore the heating coils 46 and 47 wound with small pitch, which are provided there, can be used. In the heating channel 44, however, the water becomes hot and vapor bubbles can be formed. These bubbles, however, cannot be retained in the relatively large interstices of the individual turns of the heating coil 48 wound with larger pitch. By the relatively long and narrow resistor channel 43 connecting the heating channels 42, 44 with each other it is made sure that different potentials may be applied to the terminals 31, 33, 32, 36, if desired, without undesired high current flowing through the water.

In the embodiment shown in FIG. 5, three heating channels 57, 58, 59 are provided in a plastic body 52. The channels 57, 58, 59 in analogous manner are connected with each other by resistor channels 53, 53' and with the supply and discharge sockets 55 and 56, respectively, through further resistor channels 54, 54'. Two heating coils 60, 61 are arranged in each of the heating channels 57, 58, 59, the ends of which are passed out of the plastic body 52 at both ends in the manner already described. Thereby numerous possibilities are achieved to connect the six heating coils into circuit in different manners outside the plastic body, and to connect them to the main through a flow-actuated switch. In particular, it becomes possible, for example, to switch the three heating coils 60 off, and to optionally run the apparatus at half its capacity, the remaining power being still distributed on the three heating channels 57, 58, 59.

We claim:

1. In an electric continuous flow water heater for use with a source of electric current comprising a body of insulating material having a passageway for the flow of water therethrough in a given direction with said passageway comprising with respect to the direction of water flow an elongated first heating channel and an elongated second heating channel, and having a plurality of heating coils of equal power consumption including a first heating coil in said first heating channel and extending the length thereof in direct contact with the water therein and a second heating coil in the second heating channel and extending the length thereof in direct contact with the water therein, the improvement comprising: the heating coils being constructed and arranged such that the heat output of the second heating coil per unit of length is substantially less than the heat output of the first heating coil per unit of length, thereby reducing the surface temperature of the second heating coil with respect to the surface temperature of the first heating coil so as to ameliorate the problems of calcareous deposit and early destruction of the second heating coil; and means connected to the coils to connect the coils individually to said source.

2. In an electric continuous flow water heater for use with three-phase alternating current and comprising a body of insulating material having a passageway for the flow of water therethrough in a given direction with said passageway comprising with respect to the direction of water flow an elongated first heating channel, an elongated second heating channel and an elongated third heating channel, and having a first heating coil in said first heating channel and extending the length thereof in direct contact with the water therein, a second heating coil in the second heating channel and extending the length thereof in direct contact with the water therein, and a third heating coil in the third heating channel extending the length thereof in direct contact with the water therein, the improvement comprising: said coils being of equal power consumption and adapted to be connected to one phase respectively of the said three-phase alternating current, said third heating channel and said third heating coil having a length approximately twice the length of the first heating coil and first heating channel thereby reducing the surface temperature of the third heating coil with respect to the surface temperature of the first heating coil so as to ameliorate the problems of calcareous deposit and early destruction of the third heating coil.

3. In an electric continuous flow water heater as set forth in claim 2 wherein the third heating channel comprises two juxtaposed portions each approximately equal in length to the length of the first and second heating channels.

4. In an electric continuous flow water heater as set forth in claim 2 wherein said first heating channel and said second heating channel are axially aligned with each other and are in juxtaposition with said third heating channel.

5. In an electric continuous flow water heater comprising a body of insulating material having a passageway for the flow of water therethrough in a given direction with said passageway comprising with respect to the direction of water flow an elongated first heating channel and an elongated second heating channel, and having a first heating coil in said first heating channel and extending the length thereof in direct contact with the water therein and a second heating coil in the second heating channel and extending the length thereof in direct contact with the water therein, the improvement comprising: said first heating coil being spiral in configuration and having approximately a first pitch, said second heating coil being spiral in configuration with a pitch greater than said first pitch, whereby the heat output of the second heating coil per unit of length is substantially less than the heat output of the first heating coil per unit of length so as to ameliorate the problems of calcareous deposit and early destruction of the second heating coil.

6. An electric continuous flow water heater including: a body of insulating material having a passageway for the flow of water therethrough in a given direction, said passageway comprising with respect to the direction of water flow a first resistor channel, first heating channel, a second heating channel, and a second resistor channel; a first heating coil and a second heating coil positioned sequentially in said first heating channel, said heating coils being spiral in configuration and having approximately a first pitch; a third heating coil positioned in the second heating channel, said third heating coil being spirally wound with a pitch greater than said given pitch; a first pair of binding posts electrically connected to the ends of the third heating coil and positioned externally of said body; means electrically connected to the two adjacent ends of the first two heating coils and extending externally of said body; and a second pair of binding posts electrically connected to the two-non-adjacent ends of the first and second heating coils and positioned externally of said body.

7. A heater as set forth in claim 6, wherein said means includes a single binding post electrically connected to the adjacent ends of the first and second heating coils.

8. A heater as set forth in claim 6, wherein said body has an opening through the wall thereof into the first heating channel at the position of said means; and a fluid tight plug for said opening.

9. An electric continuous flow water heater including: a body of insulating material having a passageway for the flow of water therethrough in a given direction, said passageway comprising with respect to the direction of water flow a first resistor channel, a first heating channel, a second heating channel, and a second resistor channel, said heating channels each being straight; first resistance heating coil means in the first heating channel, said coil means having a plurality of turns of a given pitch; second resistance heating coil means in the second heating channel, said second coil means having a plurality of turns of a greater pitch than that of the pitch of the turns of the first coil means; a first pair of binding posts extending through the body and into the first heating channel with the inner ends of said posts respectively being in the respective ends of the first heating channel and connected to the respective ends of the first heating coil means; a second pair of binding posts extending through the body and into the second heating channel with the inner ends of said posts respectively being in the respective ends of the second heating channel and connected to the respective ends of the second heating coil means; and binding post means extending through the body and into the first heating channel approximately midway between the ends thereof and connected to the first heating coil means midway between the ends thereof.

10. An electric continuous flow water heater for connection to a source of electricity having a plurality of conductors, said heater including: a body defining an elongated insulated water channel means; a plurality of resistance heating means positioned longitudinally in said channel means and adapted to be connected to said conductors to define a plurality of separate paths for the flow of electrical current from the source through the heating means, said heating means being constructed so that the power consumption of each path is equal to the power consumption of each remaining path, said plurality of heating means being in series in said channel means with one of the heating means being downstream of the remaining heating means, said one heating means having a heat output per unit of length substantially less than that of the upstream heating means.

References Cited by the Examiner
UNITED STATES PATENTS
| | | | |
|---|---|---|---|
| 1,746,522 | 2/1930 | Carleton | 219—307 |
| 2,596,327 | 5/1952 | Cox et al. | 219—381 |
| 2,973,424 | 2/1961 | Schomann | 219—309 |

FOREIGN PATENTS
| | | |
|---|---|---|
| 226,182 | 11/1958 | Australia. |
| 230,040 | 2/1959 | Australia. |
| 179,448 | 8/1954 | Austria. |
| 1,231,680 | 4/1960 | France. |
| 633,284 | 12/1949 | Great Britain. |
| 673,305 | 6/1952 | Great Britain. |

RICHARD M. WOOD, *Primary Examiner.*

ANTHONY BARTIS, *Examiner.*